Aug. 10, 1937.    F. B. LOMAX    2,089,214
APPARATUS FOR FILTERING EGGS
Filed Jan. 26, 1935

Inventor:
Frank B. Lomax

Patented Aug. 10, 1937

2,089,214

UNITED STATES PATENT OFFICE 2,089,214

APPARATUS FOR FILTERING EGGS

Frank B. Lomax, Chicago, Ill.

Application January 26, 1935, Serial No. 3,602

4 Claims. (Cl. 210—151)

The present invention relates to the filtration of eggs and has to do with means for forcing egg material through a screen or the like.

An object of the invention is the provision of a simple device whereby egg meats may be forced directly through a perforate basket or filter by a pressure exerting member which may form a scraper that keeps the filter clean and free from clinging or adhering material.

This object, and such other objects as may hereinafter appear, are obtained by the improved construction, unique combination, and novel arrangement of the several elements which constitute the apparatus invention, several forms of which are illustrated in the accompanying single sheet of drawing, in which.

Like reference characters are used to designate similar parts in the drawing and in the following description of the invention and of the embodiments illustrated.

Figures 1, 2, 3:
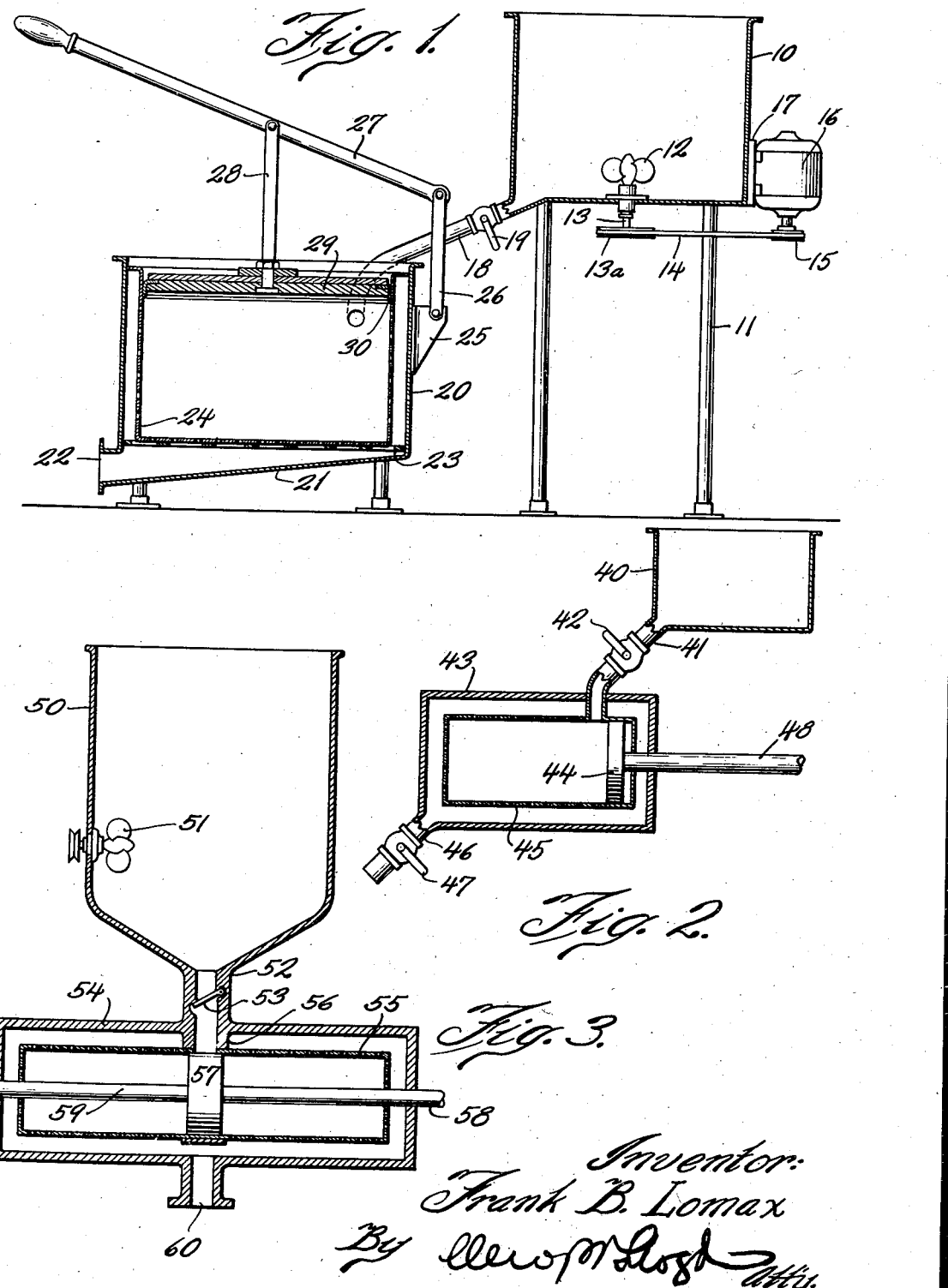
Figure 1 is a vertical section of suitable egg receiving chamber having a filter, a compressing plunger associated therewith, and means for operating the compression device.
Figure 2 is a vertical section of an egg receiving chamber having a filter and a plunger associated with such chamber.
Figure 3 is a similar view of the egg receiving chamber with opposed filters and having double acting reciprocating plungers therein.

Canned eggs are frozen and stored for use in the baking and confectionery trade. Only fresh eggs are canned. The yolk and white are separated by operatives from the shells before filtering and the egg meats thus obtained are thoroughly mixed after filtering insuring a uniform color. Before filtering, the eggs are frozen solid to preserve them. Such frozen eggs are extensively used by the trade, being more economical than eggs in the shell and more uniform in color and consistency.

It has long been the aim of egg canners to produce frozen egg meats free from foreign matter, such as egg shells, dirt and hard fibrous parts of the yolk sac, and to mix them thoroughly so as to produce a uniform color and texture, free from streaks, concurrently handling the material so that no air is incorporated into the mixture to produce foam. Shells or portions of shells get into the eggs normally because the shells are rapidly broken by the hand operatives.

In the present invention, a pump is unnecessary to transfer the egg meats, or to force such meats through the filter. Gravity is employed to transfer the eggs from the mixing tank to the filter.

The filter which is employed consists of a wire mesh screen or perforated metal sheet of sufficient porosity that the particles of shell and other undesirable materials cannot be forced through the filter but will remain on the filter bed.

For filtering eggs, the present apparatus is simple and economical. The presence of pieces of shells, dirt, unbroken chalaza, lumps, etc., in canned eggs has been a draw-back because of their reflection upon the cleanliness and purity of the product. By use of the present apparatus for removing this undesirable matter and the breaking up of the chalaza and the even more intimate mixture of the egg meats, filtered canned eggs are made more desirable and more easily marketed. After the eggs are stored and frozen, there is no settling out of any foreign matter, as is common in unfiltered eggs.

As shown in the drawing:

Figure 1 illustrates an egg receiving tank 10 of any suitable configuration. It is disposed upon legs 11 or other support, and may have a mixing propeller 12 in (or adjacent) its bottom. The propeller 12 is upon a shaft 13 provided with a pulley 13a about which a belt 14 runs, the belt 14 being driven by a drive pulley 15 upon a motor 16 attached to the side of the tank 10 by a bracket 17 or other suitable means.

There is a conduit 18, having a valve 19, extending from tank 10, the conduit emptying into a filter or basket 24 in tank or hopper 20 adjacent the top of the former and under a plunger 29. The tank 20 has a draining bottom 21 with a discharge orifice 22 at its lowest level. Transverse of the tank 20 and in a horizontal plane is a support member or grill 23 which may be of any suitable open or apertured construction. The basket 24 is removably seated on support 23 and comprises a perforated metal sheet or a reinforced wire screen, the perforations in the metal sheet or screen being of such a porosity that the basket will filter out of egg material appreciable pieces of shell, disintegrate chalaza, break up or filter out meat balls, and separate other foreign hard or fibrous substances from the egg material. If desired, the bottom of basket 24 may be non-perforate, in which event all filtered material passes through the side walls of the basket.

A bracket 25 is mounted upon the side of the tank 20. A link 26 is pivoted thereto. Pivoted to the link 26 is a lever 27. Pivoted to the lever 27 is a second link 28. The lower end of the second link is suitably connected to a piston 29 which has forwardly projecting peripheral flanges 30, the diameter of the piston with the flanges 30 thereabout being that substantially of the interior of the basket 24. The flanges 30 are of suitable material and are adapted to ride in proximity to or in physical contact with the interior walls of the basket 24. The flanges 30 may be of flexible material in order to expand outwardly in use to insure a scraping action along the interior walls of the basket 24.

The operation of the device is as follows:

Egg material, as it is collected, whether whole eggs, or whites, or yolks, is deposited in the tank. The mixing propeller is set in motion to mix the egg material. The plunger is lifted in the perforated basket to a position therein above the end of conduit 18. The valve 19 is opened. Egg material flows through the conduit 18 into basket or filter 24 until the basket is filled to the desired height. The valve 19 is then closed. The plunger 29 is forced down by operating the lever 27, egg material being forced through the perforated basket 24 as the plunger moves toward the bottom of basket 24. Material is forced through the basket 24 at the sides and the bottom (if the latter is perforated).

The flanges 30 upon the plunger 29 scrape material which adheres to the interior wall of the filter or basket 24 therefrom, releasing any material which partly extends through the perforations in the filter. Thus, at all times, the walls of the filter are kept scraped and clean. Any material which will not pass through the filter is collected upon the bottom of the basket 24, which is not subjected to the scraping and cleansing action of the flanges 30 of the plunger 29. When the first charge of material is forced out of the basket 24, the lever 27 is raised, the basket 24 is again charged with material from the tank 10, and further operation proceeds as previously described.

The basket 24 may be removed whenever desired for cleansing or replacement with a different filter.

In the form of the invention shown in Figure 2, there is a tank 40 which may have a mixing propeller in its bottom. The tank is suitably supported and is adapted to receive and temporarily store the egg material to be filtered. A conduit 41 is provided for draining tank 40. There is a valve 42 in conduit 41, such conduit extending through a housing 43 for a plunger having a reciprocating action. A plunger 44 is movable longitudinally of the housing 43 and it may be drawn first to one side of the end of conduit 41 and thereafter moved to the other side thereof. Suitably supported within the housing 43 is a basket 45 which is substantially coextensive with the plunger wall but spaced therefrom sufficiently to allow the escape of egg meats between the basket and the housing. The basket 45 has an aperture registering with the end of the conduit 41 so that egg material is loaded into basket 45 without possibility of escape between the basket and housing without being forced through the basket 45 which has a porosity similar to that of basket 24 in the previously described embodiment of the invention.

At a low level in the filter housing 43 is a discharge conduit 46 provided with a valve 47. A plunger rod 48 extends through the head of the filter housing 43 for manipulating the plunger 44. The plunger 44 may have flanges which scrape the interior walls of the screen or basket 45, operating to scrape and cleanse the basket 45 in the same manner as the plunger 29 in the previously described form of the invention cleansed basket 24. The end of basket 45 may be non-perforate if desired.

In the operation of the device, the egg material is deposited in tank 40. The plunger 44 is drawn to the extreme right (Figure 2). The valve 42 is opened. The basket 45 is filled with egg material. The valve 42 is then closed. The plunger 44 is then moved to the left (Figure 2). The outlet valve 47 may be open or closed. The capacity of the space between basket 45 and the interior wall of the housing 43 is generally sufficient to contain at least one charge from the basket 45. Filtered material may be withdrawn from housing 43 as desired. After the plunger has been moved to its extreme left position (Figure 2), it is retracted and more egg material is allowed to flow into the basket 45 in the manner just described. The operation of the plunger is then repeated.

The embodiment of the invention illustrated in Figure 3 comprises a tank 50 to receive the egg material. There is a mixing propeller 51 therein. In its bottom, there is a conduit 52 in which there is a check valve 53. Therebeneath is a housing 54 in which opposed screens 55 are suitably mounted. The screens 55 are spaced from the walls of the housing 54.

At the center of the housing 54 and in position intermediate the two ends thereof, there is an annular boss or lug 56 to which the screens 55 are made secure. The conduit empties into the screen 55 through boss 56. A plunger 57, having two operating handles, 58 and 59, is movable substantially the length of the two screens 55 and through the boss 56. Opposite sides of the plunger 57 may include scraping flanges such as have been described in connection with plunger 29. A discharge conduit 60 is provided in the housing 54.

When the plunger is in the position shown in Figure 3, no egg material will be discharged into the pump. If the plunger is moved to the left of the position illustrated in Figure 3, egg material will flow from the tank 50 into the screens 55 to substantially the capacity of the two screens. When the plunger has reached the limit of its left hand movement (Figure 3), the direction of the movement of the plunger is reversed. The plunger scraping the interior of the screen will force egg material through both of the screens 55 until the plunger 56 has again reached the position shown in Figure 3.

Movement of the plunger to the right will be continued. The remainder of the material in right hand screen 55 will be forced through such screen. As the remaining portion of the egg material is being forced through the right hand screen, the space to the left of the plunger (Figure 3) will be filled with egg material flowing from tank 50 and when the plunger has been forced to its extreme right hand position, the two screens will again be filled with egg material, ready to be ejected by movement of the plunger 57 to the left. This cycle will be continued so long as egg material remains in tank 50 and the plunger is actuated in the manners described.

Any one of the three types of filters described may be provided with a mechanical driving means to take the place of the manual operating means illustrated.

What is claimed as new and is desired to be secured by Letters Patent of the United States is:

1. An egg filtering apparatus comprising a housing, a cylindrical foraminous member removably supported in said housing, the foramina of said member being such that it disintegrates the chalaza of the eggs and prevents the passage of fragments of shell of appreciable size, a reciprocable plunger having flanges at its periphery for scraping clean the interior of said foraminous member and for cooperating with the foramina to disintegrate chalaza and forcing the egg meats therefrom, and means for reciprocating said plunger.

2. Egg filtering apparatus comprising a tank for receiving egg meats, an agitator in said tank for uniformly mixing the egg meats, a foraminous container adapted to filter the egg meats from shell fragments, a conduit for feeding the uniformly mixed egg meats from said tank to said container, a valve in said conduit to regulate the flow therethrough, a reciprocal plunger snugly engaging the walls of the container, said plunger having a peripheral scraping edge adapted to clean the container walls and disintegrate chalaza passed partly through the foramina, means for reciprocating said plunger in said container for forcing the egg meats therethrough and a receptacle surrounding the container to collect the filtered egg meats.

3. Egg filtering apparatus comprising a tank for receiving egg meats, a foraminous basket at a level below said tank, a plunger in the basket snugly engaging the side walls thereof, means for effecting relative reciprocal movement between the plunger and basket, a conduit for feeding the egg meats from the tank to the basket to be ejected therefrom by the plunger, said basket having foraminations to disintegrate the egg chalaza to a size suitable for use and to prevent the passage of appreciable sized shell fragments, said plunger having a peripheral scraping edge adapted to clean the basket walls and to disintegrate egg chalaza and a container for collecting the filtered egg meats from the basket.

4. Egg filtering apparatus comprising a tank for receiving shelled egg meats, an elongated basket below said tank having porous side and end walls permitting the passage of egg meats therethrough but retaining egg shell portions, a conduit joining the bottom of said tank with the midportion of the basket for feeding the egg meats from the tank into the basket, a double acting piston in the basket snugly engaging the side walls thereof, said plunger having peripheral scraping edges to clean the basket, means for reciprocating said piston from one end portion of the basket to the other end portion whereby egg meats flow from the conduit into the basket behind the piston on each stroke thereof for forcible filtration through the basket on the reverse piston stroke and a check valve preventing a back flow of egg meats into the tank.

FRANK B. LOMAX.